United States Patent Office 2,839,479
Patented June 17, 1958

2,839,479

POLYMERIC COMPOSITION OF AN ACRYLIC ACID ESTER AND CELLULOSE ACETATE AND METHOD OF PREPARATION

John R. Caldwell and Russell Gilkey, Kingsport, Tenn., assignors to Eastman Kodak Company, Rochester, N. Y., a corporation of New Jersey No Drawing. Application February 23, 1954
Serial No. 412,058

3 Claims. (Cl. 260—17)

This invention concerns the preparation of polymeric materials, more particularly with the manufacture of compositions containing polyacrylates in intimate mixture with water soluble cellulose acetate.

It is well known that the polyacrylates may be polymerized with various other materials such as the vinyl compounds and water insoluble cellulose esters. It is also well known that films of polyvinyl alcohol can be plasticized to give flexibility and cross linked to give water-insolubility. These polymeric materials have been used to form films for various purposes. Such films transmit water vapor. However, when they come in contact with liquid water or aqueous solutions, the plasticizer is leached from the film and a brittle, inflexible product is obtained when the film is dried. We have discovered a polymeric composition which provides a film which remains strong and flexible and which has the ability to transmit water vapor at a high rate, but will not allow the passage of liquid water even when subjected to a relatively large hydrostatic pressure. This highly selective permeability is a new and unique property and appears to be obtainable only under certain limited conditions. Previously known polymeric compounds have been unable to provide such membranes or films.

An object of this invention is to provide a method for preparing intimate mixtures of polyacrylates with cellulose acetate having an acetyl content from 13–19%. Another object of the invention is to provide films, fibers, rods, sheets, etc., made from compositions of polyacrylates in combination with soluble cellulose acetate. A further object of the invention is to furnish transparent, flexible sheets and films that have a high capacity to transmit water vapor and are valuable as leather substitutes. Still another object of the invention is to provide a coated or impregnated textile fabric or leather that has a high transmission rate for water vapor but will not allow the penetration of liquid water. Another object of the invention is to furnish a transparent, flexible coating for paper from a viscous water emulsion.

The objects of this invention are accomplished by polymerizing acrylic acid esters in the presence of cellulose acetate in water dispersion. These aqueous emulsions or dopes so obtained can be coated or cast to give films. These films are permeable to water vapor but are impermeable to liquid water.

The cellulose acetate which is used in this process is water soluble, and can be prepared according to Fordyce's directions in U. S. Patent No. 2,129,052.

The acrylic acid esters used in the process are derived from straight and branched alcohols containing from 1 to 6 carbon atoms. Suitable esters are those derived from the following alcohols: methyl, ethyl, propyl, n-butyl, isobutyl, sec-butyl, n-amyl, isoamyl and the like. A mixture of acrylic esters with other vinyl monomers such as methacrylates, vinyl acetate, vinyl chloride, acrylonitrile, methacrylonitrile, styrene, methacrylamide and isopropyl acrylamide, may be used. The mixture should contain at least 50 mole percent acrylic ester.

The compositions contain from 20 percent to 75 percent soluble cellulose acetate, while the preferred range is 30 percent to 60 percent cellulose acetate.

The polymerization is carried out in aqueous dispersion. The cellulose acetate is dissolved in water to give a solution of 5 to 30 percent concentration and the acrylate monomer is added. Emulsifying agents such as sodium salts of sulfated fatty alcohols, soaps, aromatic sulfonates, etc., can be used but are not necessary. The more reactive acrylate monomers should be added in several portions in order to obtain a smooth, viscous emulsion. In order to obtain resistance to organic solvents, it is desirable to cross link the acrylate resin. This can be done during polymerization by adding 0.5 to 5 percent (based on total monomer) and preferably 1.0 to 3.0 percent of a divinyl compound such as divinyl benzene, allyl acrylate, allyl phthalate.

Water-soluble catalysts such as sodium persulfate, potassium persulfate, hydrogen peroxide, are used. A promoter such as sodium sulfite or sodium bisulfite can be added to speed up the polymerization. From 0.05 percent to 3.0 percent and preferably 0.5 percent to 1 percent catalyst is used, based on the weight of monomers. The preferred range of promoter is 0.1 percent to 1 percent, based on the weight of monomers.

The mixture is agitated at a temperature of 40° to 120° C. and preferably at 50° to 75° C. for 3 to 12 hours.

The final product is a smooth, viscous emulsion or cream that contains no lumps or irregularities. In order to obtain films, fibers, and the like, that are resistant to immersion in water, it is necessary to add a hardening agent for the cellulose acetate. In general, any of the known hardening agents may be used. Suitable examples include formaldehyde, trimethylol nitromethane, methylol ureas, methylol melamines, zirconium salts, polybasic acids, and the like. From 1 percent to 15 percent and preferably 2 percent to 10 percent hardening agent is used, based on the weight of cellulose acetate present in the emulsion. At this stage, the emulsion is ready to be coated, extruded, or used for dipping, as desired. Evaporation of the emulsion leaves a clear, flexible, tough film. It can be coated on fabrics, paper and leather by the usual methods employing rolls and doctor blades. From 10 to 50 percent and preferably 20 to 30 percent resin is added to the material to be coated, on a dry weight basis. The coated article is then dried at 100–120° C.

Fire-retarding agents such as tricresyl phosphate, triphenyl phosphate, chloroethyl phosphate, and the like, may be incorporated in the resin film.

Fibers may be spun from the dispersions by extrusion through a multi-hole spinneret into a coagulating bath of sodium sulfate or other salt. Alternatively, a dry spinning process can be used wherein the dope is extruded downward through a spinneret into a heated atmosphere that evaporates the water.

Example 1

Twenty-five grams of water-soluble cellulose acetate is dissolved in 200 cc. water and the following materials are added:

50 g. methyl acrylate
0.5 g. diallyl phthalate
0.5 g. sodium dodecyl sulfate
0.5 g. potassium persulfate
0.4 g. sodium bisulfite The mixture is stirred at 50–60° C. for 4 hours. A viscous, opaque emulsion is obtained. One gram of trimethylol melamine and 0.1 g. of diammonium hydrogen phosphate are added to harden the cellulose acetate.

A sample of the emulsion is coated on a glass plate and heated at 100–110° C. to evaporate the water. A clear, tough, elastic film is obtained. This film is not dissolved by water, acetone, or naphtha. It has a high capacity for transmitting water vapor.

*Example 2*

One hundred grams of water-soluble cellulose acetate is dissolved in 1000 cc. water and the following materials are added:

300 g. ethyl acrylate
    3 g. allyl acrylate
    3 g. ammonium persulfate

The mixture is stirred at 55–65° C. for 8 hours. A smooth viscous emulsion is obtained. Five grams of trimethylol nitromethane is added as a hardening agent for the cellulose acetate.

Nylon sharkskin fabric is coated with the emulsion to give an increase in weight of 15–20 percent, on a dry basis. The coated cloth is dried at 110–120° C.

The coated fabric shows a water vapor transmission of 50–60 percent of the untreated fabric. It holds a hydrostatic head of 6 feet of water.

*Example 3*

Fifty grams of water-soluble cellulose acetate is dissolved in 600 cc. water and the following materials are added:

80.0 g. ethyl acrylate
    40.0 g. vinyl acetate
    1.0 g. allyl adipate
    1.2 g. potassium persulfate
    0.6 g. sodium bisulfite
    0.6 g. sodium octadecyl sulfate The mixture is stirred at 60–70° C. for 6 hours. A viscous emulsion is formed. Ten cc. of 40 percent formaldehyde solution and 0.5 g. of ammonium chloride are added to the emulsion.

Tanned leather, of the type used for hiking boot uppers, is coated with the emulsion to give an increase in weight of 15–20 percent, on a dry basis. After drying at 90–100° C., the coated leather is heated at 120° C. for 15 minutes.

The treated leather is soft and flexible. It shows a moisture vapor transmission of 60–70 percent of the uncoated material. It holds a hydrostatic head of 4 feet of water without seepage.

*Example 4*

Fifty grams of water-soluble cellulose acetate is dissolved in 400 cc. water and the following materials are added:

50 g. methyl acrylate
    50 g. methacrylamide
    2.0 g. allyl phthalate
    1.0 g. ammonium persulfate The mixture is stirred at 50–60° C. for 8 hours to give a highly viscous emulsion.

As a hardening agent, 5 g. of dimethylol urea and 0.5 g. of diammonium hydrogen phosphate are added. The dope is extruded downward through a multi-hole spinneret into a hot air cabinet maintained at 140 to 150° C. The filaments are collected on a spool at the bottom of the cabinet. The yarn is then heated at 110 to 120° C. for 30 minutes to render it insoluble in water. Strong, elastic fibers are produced that retain their shape in boiling water. They have a strong affinity for direct cotton dyes, acid wool dyes, and cellulose acetate dyes.

*Example 5*

Twenty grams of water-soluble cellulose acetate is dissolved in 300 cc. water and the following materials are added:

40 g. ethyl acrylate
    20 g. butyl acrylate
    1.0 g. sodium dodecyl sulfate
    1.0 g. potassium persulfate The mixture is stirred at 65–75° C. for 5 hours to give a viscous, creamy emulsion.

Two grams of trimethylol melamine and 0.3 g. of phosphoric acid are added to harden the cellulose acetate. Fifteen parts of titanium dioxide pigment are added. This composition is useful as a water-base wall paint. It air dries to give smooth, tough coatings that can be washed with soap and water.

The product is also useful as a dipping lacquer.

The special properties of the films obtained by this invention make them valuable for the following uses: the manufacture of gas-proof clothing, rainwear and waterproof leather products, substitutes for leather in shoe uppers, tents. The products of this invention may also be converted into strong elastic fibers that show a high capacity for moisture and dye absorption. The product may also be used as water based paints. They are also valuable in coating paper to give a flexible backing.

We claim:

1. A polymeric composition formed by the polymerization of 70–25 weight percent of an ester of acrylic acid and a saturated monohydric aliphatic alcohol containing from one to six carbon atoms polymerized in intimate mixture with 20–75 weight percent of a water soluble cellulose acetate having an acetyl content of from 13 to 19% dissolved in water to give a solution of 5–30% concentration, agitating the mixture at a temperature of 40–120° C. and hardening by contacting with a hardener selected from the class consisting of formaldehyde, trimethylol nitromethane, dimethylol urea and trimethylol melamine.

2. A process for the polymerization of esters of acrylic acid and saturated monohydric aliphatic alcohols containing from one to six carbon atoms in intimate mixture with water soluble cellulose acetate having an acetyl content of from 13 to 19% comprising dissolving a 20–75 weight percent of the water soluble cellulose acetate in water to give a solution of 5–30% concentration, adding from 70–25 weight percent of the acrylate monomer and heating to a temperature of 40–120° C. and hardening by contacting with a hardener selected from the class consisting of formaldehyde, dimethylol urea, trimethylol nitromethane and trimethylol melamine.

3. A polymeric composition formed by the polymerization of 70–25% of a mixture of a vinyl monomer selected from the class consisting of vinyl acetate, vinyl chloride, acrylonitrile, methacrylonitrile, styrene, methacrylamide and isopropyl acrylamide and at least 50 mol percent of an ester of acrylic acid and a saturated monohydric aliphatic alcohol containing from one to six carbon atoms polymerized in intimate mixture with from 20–75% of a water soluble cellulose acetate having an acetyl content of from 13 to 19% dissolved in water to give a solution of 5–30% concentration, agitating the mixture at a temperature of from 40–120° C. for from 3 to 12 hours and hardening with a hardener selected from the class consisting of formaldehyde, trimethylol nitromethane, dimethylol urea and trimethylol melamine.

References Cited in the file of this patent

UNITED STATES PATENTS

| | | |
|---|---|---|
| 2,129,052 | Fordyce | Sept. 6, 1938 |
| 2,703,284 | White et al. | Mar. 1, 1955 |

FOREIGN PATENTS

| | | |
|---|---|---|
| 482,194 | Great Britain | Mar. 21, 1938 |